United States Patent
Oda et al.

[11] Patent Number: 6,096,846
[45] Date of Patent: Aug. 1, 2000

[54] ULTRAVIOLET ABSORBING BASE MATERIAL

[75] Inventors: Haruo Oda; Tsutomu Sunada; Yoshihiro Nakahata, all of Aichi, Japan

[73] Assignee: Nidek Co., Ltd., Aichi, Japan

[21] Appl. No.: 09/144,523

[22] Filed: Aug. 31, 1998

[30] Foreign Application Priority Data

Aug. 29, 1997 [JP] Japan ..................... 9-249398
Apr. 23, 1998 [JP] Japan ................... 10-112916
Jul. 24, 1998 [JP] Japan ................... 10-208784

[51] Int. Cl.⁷ .................... C08L 39/04; C08F 218/08; C08F 226/06; G02C 7/04
[52] U.S. Cl. .................. 526/261; 526/259; 526/320; 523/108; 351/160 R; 351/160 H
[58] Field of Search ............... 526/259, 261, 526/320; 523/108; 525/326.7; 351/160 H

[56] References Cited

U.S. PATENT DOCUMENTS

| | | | |
|---|---|---|---|
| 4,528,311 | 7/1985 | Beard et al. | 526/259 |
| 4,719,248 | 1/1988 | Bambury, et al. | |
| 4,845,180 | 7/1989 | Henry et al. | 526/259 |
| 4,889,664 | 12/1989 | Kindt-Larsen et al. | 523/108 |
| 5,032,498 | 7/1991 | Redy et al. | 526/259 |
| 5,532,289 | 7/1996 | Benz et al. | 526/320 |

FOREIGN PATENT DOCUMENTS

| | | |
|---|---|---|
| 0 283 166 A1 | 9/1988 | European Pat. Off. |
| 0 488 145 A2 | 6/1992 | European Pat. Off. |
| 60-38411 | 2/1985 | Japan. |
| 63-185969 | 8/1988 | Japan. |
| 2-63463 | 3/1990 | Japan. |
| 4-190318 | 7/1992 | Japan. |
| 2501778 | 3/1996 | Japan. |
| WO 97/01114 | 1/1997 | WIPO. |

*Primary Examiner*—Tae Yoon
*Attorney, Agent, or Firm*—Sughrue, Mion, Zinn, Macpeak & Seas, PLLC

[57] ABSTRACT

An ultraviolet absorbing base material is disclosed in which a vinyl copolymerizable monomer and a benzotriazole ultraviolet absorbing monomer represented by formula (I) or (II) are copolymerized:

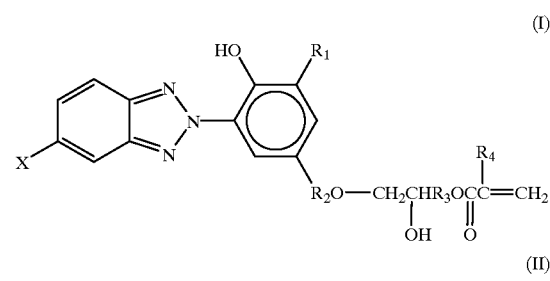

(I)

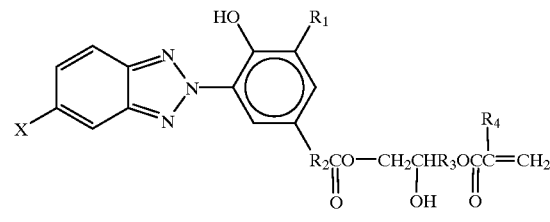

(II)

wherein X represents H or a halogen, $R_1$ is H or an alkyl group having 1 to 6 carbon atoms, $R_2$ and $R_3$ each represents a linear or branched $C_1$–$C_{10}$ alkylene group and $R_4$ represents H or $CH_3$.

12 Claims, 3 Drawing Sheets

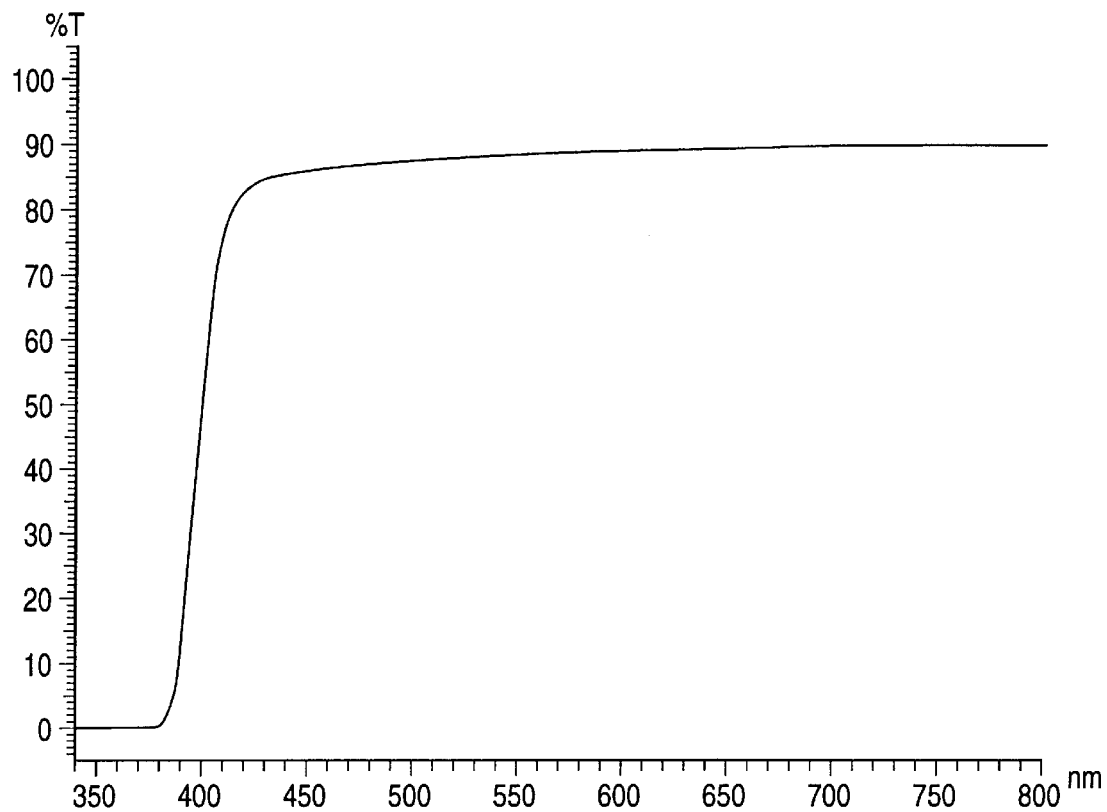

ULTRAVIOLET ABSORBING BASE MATERIAL

BACKGROUND OF THE INVENTION

1. Field of the Invention

The present invention relates to a material for an ocular lens (an lens for an eye), in which an ultraviolet absorbing copolymer is used.

2. Description of the Related Art

As ocular lenses, contact lenses and intraocular lenses have conventionally been used for the correction of visual acuity and as a substitute for the eye lens in the operation of cataract, respectively. Base materials for the ocular lens can be classified into several kinds according to their properties. Typical examples of the base material include polymethyl methacrylate (PMMA) which is a not-water-containing type, has a narrow intramolecular space and is rigid and polyhydroxyethyl methacrylate (PHEMA) which is a water-containing type and has a relatively wide intramolecular space. Different from the eye lens, however, neither of them is not able to absorb ultraviolet rays. Various intraocular lenses imparted with ultraviolet absorbing properties have therefore been proposed.

In fact, a benzotriazole ultraviolet absorber has been added to PMMA lens. Although the base material and the ultraviolet absorber are only physically bound each other, a rigid polymer typified by PMMA has an intramolecular space narrow enough not to allow the passage of the ultraviolet absorber. The ultraviolet absorber is therefore not easily eluted from the PMMA lens.

Water-containing type polymers typified by PHEMA or soft materials have a relatively wide intramolecular space so that elution of an ultraviolet absorber having a low molecular weight occurs and the addition of such an absorber does not bring about the desired effect. Several methods have already been disclosed with a view to preventing such a problem. They are however not satisfactory because of a troublesome synthesizing operation, a large amount of elution or insufficient wavelength absorption characteristics.

SUMMARY OF THE INVENTION

A technical object of the present invention is to provide, in view of the above-described problems, an ultraviolet absorbing base material which can be synthesized easily, has a relatively wide intramolecular space and even so, can absorb ultraviolet rays stably, more specifically, can absorb ultraviolet rays stably without elution of the ultraviolet absorber from the base material.

Another object of the present invention is to provide, for the production of an intraocular lens, an ultraviolet absorbing base which has the optimum wavelength absorption region, is handled easily upon insertion of the lens, is comparatively quiet in the expanding behavior in the eye and has sufficient strength.

The present invention has following features, thereby overcoming the above-described problems.

(1) An ultraviolet absorbing base material in which a vinyl copolymerizable monomer and a benzotriazole ultraviolet absorbing monomer represented by formula (I) are copolymerized:

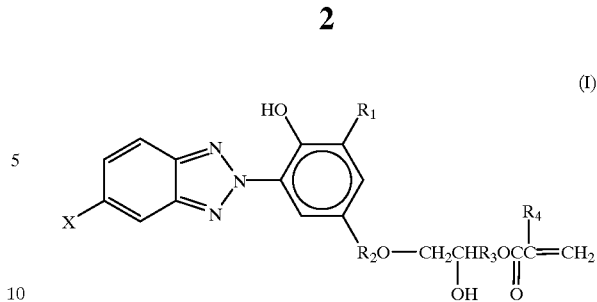

wherein X represents H or a halogen, $R_1$ is H or an alkyl group having 1 to 6 carbon atoms, $R_2$ and $R_3$ each represents a linear or branched $C_1$–$C_{10}$ alkylene group and $R_4$ represents H or $CH_3$. The alkyl group in $R_1$ is preferably a t-alkyl group having 4–6 carbon atoms.

(2) Described specifically, the ultraviolet absorbing base material described in (1) wherein the ultraviolet absorbing monomer is 2-[2-hydroxy-5-methacryloxy(2'-hydroxy-3'-propoxy)propyl-3-t-butylphenyl]-2H-benzotriazole (i.e., the ultraviolet absorbing monomer wherein X=H, $R_1$=—C$(CH_3)_3$, $R_2$=—$C_3H_6$—, $R_3$=—$CH_2$—, $R_4$=—$CH_3$ in formula (I)).

(3) An ultraviolet absorbing base material in which a vinyl copolymerizable monomer and a benzotriazole ultraviolet absorbing monomer represented by formula (II) are copolymerized:

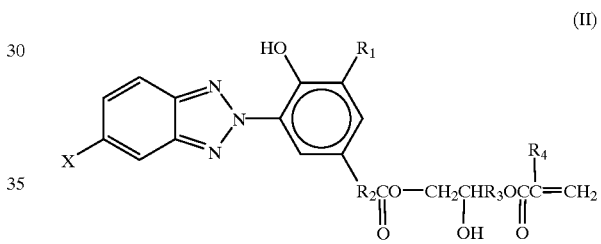

wherein X represents H or a halogen, $R_1$ is H or an alkyl group having 1 to 6 carbon atoms, $R_2$ and $R_3$ each represents a linear or branched $C_1$–$C_{10}$ alkylene group and $R_4$ represents H or $CH_3$. The alkyl group in $R_1$ is preferably a t-alkyl group having 4–6 carbon atoms.

(4) Described specifically, the ultraviolet absorbing base material described in (3), wherein the ultraviolet absorbing monomer is 2-[2-hydroxy-5-methacyloxy(2'-hydroxy-3'-propoxy)(1'-oxopropyl)-3-t-butylphenyl]-2H-benzotriazole (i.e., the ultraviolet absorbing monomer wherein X=H, $R_1$=—C$(CH_3)3$, $R_2$=—$C_2H_4$—, $R_3$=—$CH_2$— and $R_4$=—$CH_3$ in formula (II)).

(5) The ultraviolet absorbing base material described in (2) or (4), wherein 2-hydroxyethyl methacrylate as the vinyl copolymerizable monomer is copolymerized in an amount of 70 to 90 wt % based on the base material.

(6) The ultraviolet absorbing base material described in (5), wherein ethyl methacrylate as the vinyl copolymerizable monomer is further copolymerized in an amount of 8 to 20 wt % based on the base material.

(7) The ultraviolet absorbing base material described in (6), wherein the ultraviolet absorbing monomer is copolymerized in an amount of 0.3 to 5.5 wt % based on the base material.

(8) The ultraviolet absorbing base material described in (7), which is used for forming an ocular lens.

(9) The ultraviolet absorbing base material described in (8), wherein the ocular lens is an intraocular lens used in place of an crystalline lens in an eye.

(10) The benzotriazole ultraviolet absorbing monomer represented by formula (I) or (II) may be easily synthesized by subjecting a compound having a carboxyl or hydroxyl group at a phenylbenzotriazole end thereof to ring-opening polymerization with a copolymerizable vinyl monomer containing a glycidyl group. Examples of the compound having a carboxyl or hydroxyl group at a phenylbenzotriazole end thereof include the following formulas (III) or (IV).

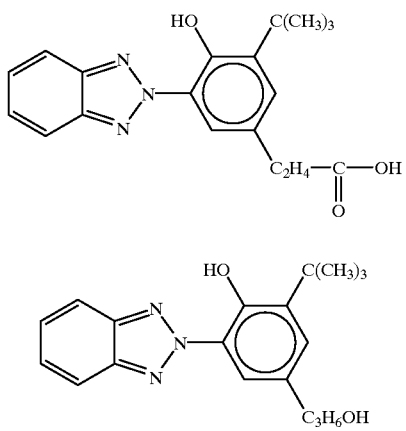

(11) The ultraviolet absorbing base material described in (10), wherein the copolymerizable vinyl monomer containing a glycidyl group is glycidyl methacrylate.

(12) The ultraviolet absorbing base material described in (10), wherein 2-hydroxyethyl methacrylate as the vinyl copolymerizable monomer is copolymerized in an amount of 70 to 90 wt % based on the base material.

(13) The ultraviolet absorbing base material described in (12), wherein ethyl methacrylate as the vinyl copolymerizable monomer is further copolymerized in an amount of 8 to 20 wt % based on the base material.

BRIEF DESCRIPTION OF THE DRAWINGS

FIG. 2 illustrates the optical transmittance of the substance obtained by polymerizing and solidifying the ultraviolet absorbing monomer obtained in Example.

FIG. 3 illustrates the measurement results when EMA was polymerized with HEMA.

DETAILED DESCRIPTION OF THE INVENTION

Figure 1:
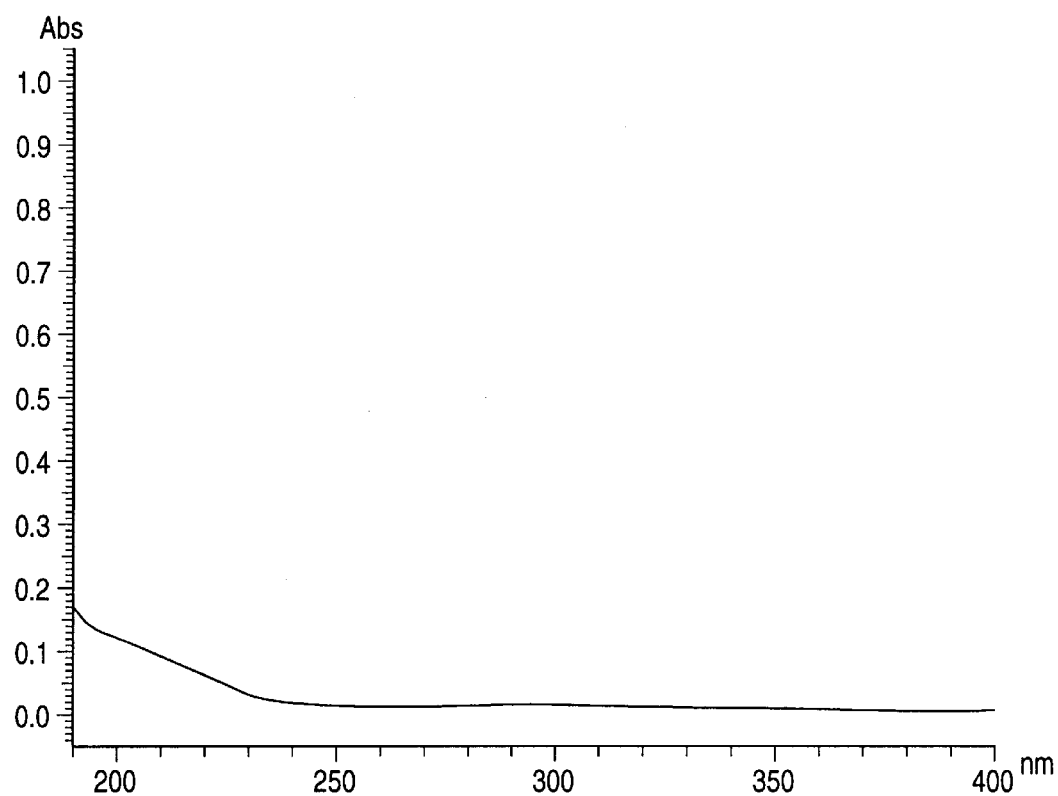
FIG. 1 illustrates the measurement results of the elution of the ultraviolet absorbing monomer obtained in Example, caused by boiling, from the polymerized and solidified substance thereof through a spectrophotometer.

The vinyl copolymerizable monomer for use in the ultraviolet absorbing base material may be a copolymer of ethyl methacrylate and 2-hydroxyethyl methacrylate; however, various vinyl copolymerizable monomers conventionally known can be employed for the ultraviolet absorbing base material of the present invention. Examples will be described below. Incidentally, the term " . . . (meth)acrylate" as used herein means " . . . acrylate" or " . . . methacrylate".

Examples thereof include linear, branched and cyclic alkyl (meth)acrylates and silicon-containing (meth)acrylates such as methyl (meth)acrylate, ethyl (meth)acrylate, propyl (meth)acrylate, n-butyl (meth)acrylate, tert-butyl (meth) acrylate, isobutyl (meth)acrylate, n-pentyl (meth)acrylate, tert-pentyl (meth)acrylate, hexyl (meth)acrylate, 2-methylbutyl (meth)acrylate, heptyl (meth)acrylate, octyl (meth)acrylate, 2-ethylhexyl (meth)acrylate, nonyl (meth) acrylate, decyl (meth)acrylate, dodecyl (meth)acrylate, stearyl (meth)acrylate, cyclopentyl (meth)acrylate and cyclohexyl (meth)acrylate.

When a material having a hydrophilic surface is desired, the following monomers can be used for example.

Examples thereof include N-vinyllactams such as N-vinylpyrrolidone, a-methylene-N-pyrrolidone and N-vinylcaprolactam; hydroxyl-containing (meth)acrylates such as hydroxyethyl (meth)acrylate, hydroxypropyl (meth) acrylate, hydroxybutyl (meth)acrylate, dihydroxypropyl (meth)acrylate, dihydroxybutyl (meth)acrylate, diethylene glycol mono(meth)acrylate, triethylene glycol mono(meth) acrylate and dipropylene glycol mono(meth)acrylate; (meth) acrylic acid; (meth)acrylamide, N-methyl (meth) acrylamide, N-ethyl (meth)acrylamide, N-hydroxyethyl (meth)acrylamide, N,N-dimethyl (meth)acrylamide, N,N-diethyl (meth)acrylamide and N-ethylaminoethyl (meth) acrylamide.

In addition, it is possible to use copolymers of the above-described monomers. Examples of the combination include a copolymer of ethyl methacrylate and 2-hydroxyethyl methacrylate, copolymer of ethyl methacrylate and methyl methacrylate, copolymer of 2-ethylhexyl methacrylate and butyl methacrylate and copolymer of 2-ethylhexyl methacrylate and dodecyl methacrylate.

Incidentally, a crosslinking agent typified by ethylene glycol (meth)acrylate or diethylene glycol di(meth)acrylate can be added in view of the stability of such a copolymer.

The present invention will be explained below in more detail by reference to the following Examples, but the invention should not be construed as being limited thereto.

EXAMPLE 1

Synthesis process of 2-[2-hydroxy-5-methacryloxy(2'-hydroxy-3'-propoxy)propyl-3-t-butylphenyl]-2H-benzotriazole:

(1) A commercially available product including a dimer of benzotriazole represented by the following formula (V) is arranged. This commercially available product is a condensed product of methyl-3-[3-t-butyl-5-(2H-benzotriazole-2-yl)-4-hydroxyphenyl]propionate and polyethylene glycol (molecular weight: about 300), for example, (Tinuvin 213; produced by CIBA-GEIGY AG).

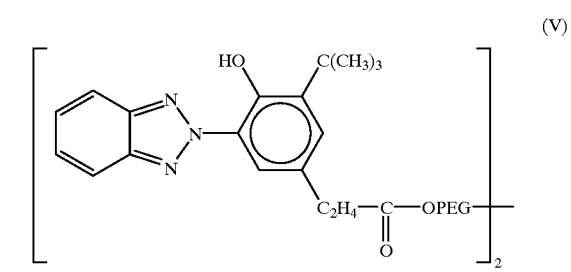

Tinuvin 213 (60 g) was charged in 500 ml of a 5N aqueous KOH solution while stirring to obtain a product having a carboxylate at a phenylbenzotriazole end thereof. An acid 5N aqueous HCl solution was then added dropwise to the resulting solution. When the amount exceeded 300 ml, the solution started precipitation of a white precipitate having a carboxyl group at a phenyltriazole end thereof such as the following formula (III). Then, 500 ml in total of the aqueous HCl solution were added to obtain a turbid solution containing the above white precipitate.

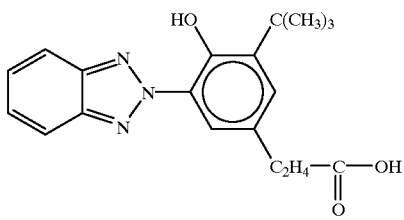

(III)

To the above turbid solution, ethyl acetate having a concentration of at least 99.5% was added dropwise while stirring. Addition of ethyl acetate was stopped at the time when the turbidity (white precipitate) disappeared. Since the resulting mixture had already separated into an organic layer and an aqueous layer, the organic layer was taken out, followed by washing with pure water. After washing the organic layer with water two or three times, the solvent (ethyl acetate) was removed to obtain a solidified carboxylic acid.

To the solidified carboxylic acid, a solution mixture (50:50) of ethyl acetate having a concentration of at least 99.5% and methanol having a concentration of at least 99.8% was added dropwise. Then, crystals of the carboxylic acid were obtained by recrystallization.

(2) To 3 g of the carboxylic acid obtained by the above operation, anhydrous ether was added to dissolve the former in the latter. LiAlH$_4$ (0.49 g) was added to the resulting solution as a reducing agent. The resulting mixture was refluxed for about 12 hours while maintaining the temperature at 35 to 38° C. After reflux, 2.6 ml of ethyl acetate were added dropwise to the reaction mixture, followed by the dropwise addition of about 1 ml of pure water. Several drops of 1N HCl were added to adjust the pH of the reaction mixture to 3.0 to 4.0. After adjustment, the resulting solution was washed with pure water. After washing, the ether layer was taken out and subjected to filtration. After such an operation was repeated two or three times, the solvent was removed from the ether layer to separate to obtain a product having a hydroxyl group at a phenylbenzotriazole end thereof such as the following formula (IV):

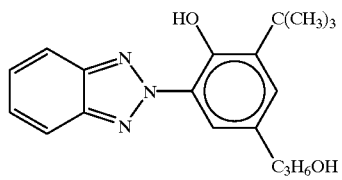

(IV)

The resulting product was added to glycidyl methacrylate, followed by stirring for 5 hours under alkaline conditions while maintaining the temperature at 80 to 90° C. After completion of the reaction, ethyl acetate was added to the reaction mixture. The resulting mixture was filtered and subjected to desolvation, whereby a synthesized product represented by the following formula (IV):

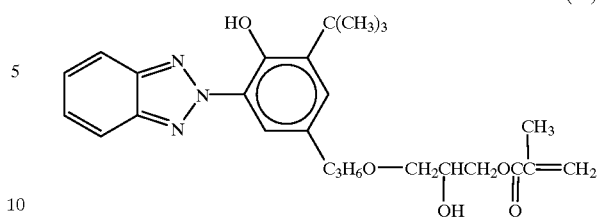

(VI)

EXAMPLE 2

Synthesis process of 2-[2-hydroxy-5-methacyloxy(2'-hydroxy-3'-propoxy)(1'-oxopropyl)-3-t-butylphenyl]-2H-benzotriazole:

(1) A commercially available product including a dimer of benzotriazole represented by the following formula (V) is arranged. This commercially available product is a condensed product of methyl-3-[3-t-butyl-5-(2H-benzotriazole-2-yl)-4-hydroxyphenyl]propionate and polyethylene glycol (molecular weight: about 300), for example, (Tinuvin 213; produced by CIBA-GEIGY AG).

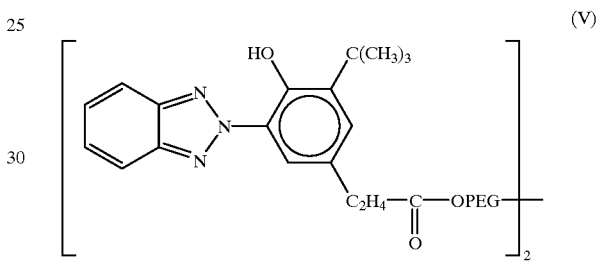

(V)

Tinuvin 213 (60 g) was added to 500 ml of a 5N aqueous KOH solution while stirring to obtain a product having a carboxylate at a phenylbenzotriazole end thereof.

To the resulting product, an acidic 5N aqueous HCl solution was added dropwise. When the amount exceeded 300 ml, the solution started precipitation of a white precipitate having a carboxyl group at a phenyltriazole end thereof such as the following formula (III). Then, 500 ml in total of the aqueous HCl solution were added to obtain a turbid solution containing the above white precipitate.

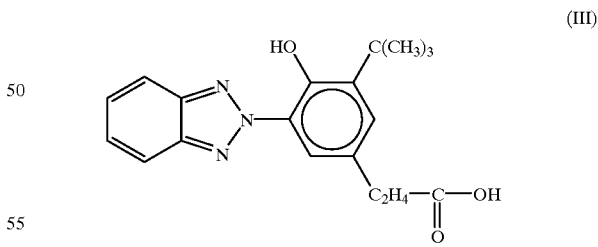

(III)

To the above turbid solution, ethyl acetate having a concentration of at least 99.5% was added dropwise while stirring. Addition of ethyl acetate was stopped at the time when the turbidity (white precipitate) disappeared. Since the resulting mixture had already separated into an organic layer and an aqueous layer, the organic layer was taken out, followed by washing with pure water. After washing the organic layer with water two or three times, the solvent (ethyl acetate) was removed to obtain a solidified carboxylic acid.

To the solidified carboxylic acid, a solution mixture (50:50) of ethyl acetate having a concentration of at least 99.5% and methanol having a concentration of at least 99.8% was added dropwise. Then, crystals of the carboxylic acid were obtained by recrystallization.

(2) The crystals so obtained were added to glycidyl methacrylate, followed by stirring for 5 hours under alkaline conditions while maintaining the temperature at 80 to 90° C. After completion of the reaction, ethyl acetate was added to the reaction mixture. The resulting mixture was filtered and subjected to desolvation, whereby a product represented by the following formula (VII):

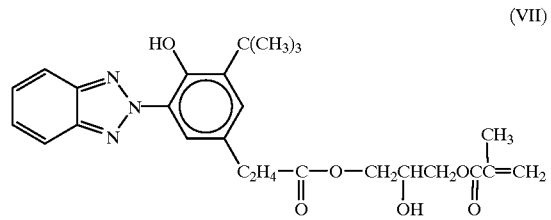

(VII)

The ultraviolet absorbing monomer obtained in Example 2 was added in an amount of 1 wt. % to 2-hydroxyethyl methacrylate (HEMA). The resulting mixture was charged in a test tube or the like, followed by thermal polymerization at 50° C. (24 hrs), 60° C. (24 hrs) and 70° C. (24 hrs) in a temperature controlled bath, and at 100° C. (24 hrs) in an air oven. The test tube so treated was then placed in an autoclave at 121° C. for about 30 minutes, whereby thermal polymerization was completed.

After completion of the thermal polymerization, the resulting polymer was boiled. The elution of the ultraviolet absorber (ultraviolet absorbing monomer) was studied by measuring the absorbance, in a ultraviolet range, of the boiled liquid. The results are shown in FIG. 1. As apparent from the results, elution due to the ultraviolet absorber was not observed.

In addition, the light transmittance of the substance obtained by adding the ultraviolet absorbing monomer to HEMA in an amount of 1 wt. %, followed by polymerization and solidification in a similar manner to that described above was measured. The results are shown in FIG. 2. As apparent from the results, absorption of ultraviolet rays was observed.

EXAMPLE 3

The ultraviolet absorbing monomer synthesized in Example 2 was copolymerized with 2-hydroxyethyl methacrylate (HEMA) and ethyl methacrylate (EMA) in the following manner.

In a solution having 55.9307 g (82.0 wt. %) of HEMA and 8.5144 g (12.5 wt. %) of EMA mixed therein, 1.6979 g (2.5 wt. %) of ethylene glycol dimethacrylate (EGDMA) as a crosslinking agent, 0.0146 g (0.002 wt. %) of AIBN as a polymerization initiator and 2.350 g (2.98 wt. %) of the ultraviolet absorbing monomer obtained in Example 2 were charged, followed by thorough stirring. The reaction mixture was thermally polymerized at 50° C. (24 hours), 60° C. (24 hours) and 70° C. (24 hours) in a temperature conditioned bath and at 100° C. (24 hours) in an air oven, followed by heating at 121° C. for about 30 minutes in an autoclave, whereby the thermal polymerization was completed.

A description will next be made of a process for producing an intraocular lens from the ultraviolet absorbing base material so obtained, more specifically, a process for producing a 1-piece lens. First, the ultraviolet absorbing base material is formed into a plate of a predetermined thickness, from which a disc to be a core of the intraocular lens is cut out. The core cut in the shape of a disc is then installed on a jig. One side of the core is then turned into a shape of the actual intraocular lens. After the completion of the turning on one side, the core is taken out from the jig and then installed on the jig again in such a way that the other side can be turned. The other side of the lens is then turned similarly into the shape of the intraocular lens. After the turning of the both sides is finished, polishing and then rinsing are carried out. The lens is completed as a product after the inspection of its surface, size, optical performance, appearance and the like.

The above-described production process is for a 1-piece lens having an optical portion and supporting portion integrally formed. In addition to it, there is a 3-piece lens which has an optical portion and a supporting portion integrated after separately formed. The three-piece lens has two types, one is made of the same material and the other is made of different materials. In either of them, the ultraviolet absorbing monomer according to the present invention can be applied after polymerization.

Upon production of a more appropriate intraocular lens, a comparison experiment as described below was conducted in order to determine the mixing ratio of the raw materials of the ultraviolet absorbing base which would be a material of the lens.

COMPARATIVE EXAMPLE 1

FIG. 3 illustrates the characteristics of the bases obtained by copolymerizing HEMA and EMA at varied mixing ratios without adding the ultraviolet absorbing monomer.

In FIG. 3, shown are the data of the evaluation experiment of the copolymers obtained by changing the ratio of HEMA at five stages within a region of 70 to 90 wt. %. The ratio of the EMA, another component to be copolymerized, was changed within a region of 8 to 30 wt. % and EGDMA was added in an amount of 0 to 2 wt. % as a crosslinking agent. The polymerization initiator was added in a small amount. As an evaluation method from the base so synthesized, an optical part of the intraocular lens having a diameter of 6.0 mm, a curvature radius of 8.0 mm on its surface and an edge thickness of 0.35 mm was manufactured, followed by autoclave sterilization for about 30 minutes to hydrate it sufficiently. A force required for folding and an expanding rate of the lens were measured.

The force required for folding will be an important index for the force necessary for the deformation of the lens. The measurement was carried out by bringing one end of the intraocular lens into contact with the measuring surface of a balance and reading the scale while folding the other end of the lens into a U-shape by a pincette. The deformation of the lens was stopped just before the both ends of the lens were in contact and the scale of the balance at this point was measured as the force required for folding.

The expanding rate will be an index of an expanding state of the lens in the eye. It was determined by measuring the time required for the recovery of the lens from the deformed state into the original shape when the lens, which had been deformed enough to bring both ends of the lens into contact, was picked up with a pincette, put into water of about 25° C. while maintaining the deformation and then released the lens from the deformation by the opening of the pincette in water. Whether the lens recovered the original shape or not was confirmed by visual observation.

As can be understood from the experimental results in FIG. 3, when the mixing ratio of HEMA is decreased, for example, to 1, the force required for folding increases and the expanding rate becomes slow. When the mixing ratio of HEMA is increased, for example, to 2 or 4, on the other hand, the force required for folding becomes small and the expanding rate becomes high. It can also be understood that the force required for folding is substantially proportional to the HEMA:EMA mixing ratio.

In addition, it can be understood that when the mixing ratio is 3 or 5 in the presence of a crosslinking agent EGDMA, there is a tendency that the force required for folding becomes larger and the release rate becomes higher compared with the case where the mixing ratio is 2 or 4 in the absence of EGDMA. Although the copolymer containing HEMA in an amount of 60 to 95 wt. % can be used sufficiently as an ocular lens, the most optimum mixing ratio of HEMA is found to be about 80 to 90 wt. % as a result of the experiment, judging from that the deformable intraocular lens which is most easily handled in the intraocular-lens-inserting-operation requires a force of about 50 to 150 g for folding and is released at a rate of several seconds to tens of seconds.

COMPARATIVE EXAMPLE 2

Figure 4:
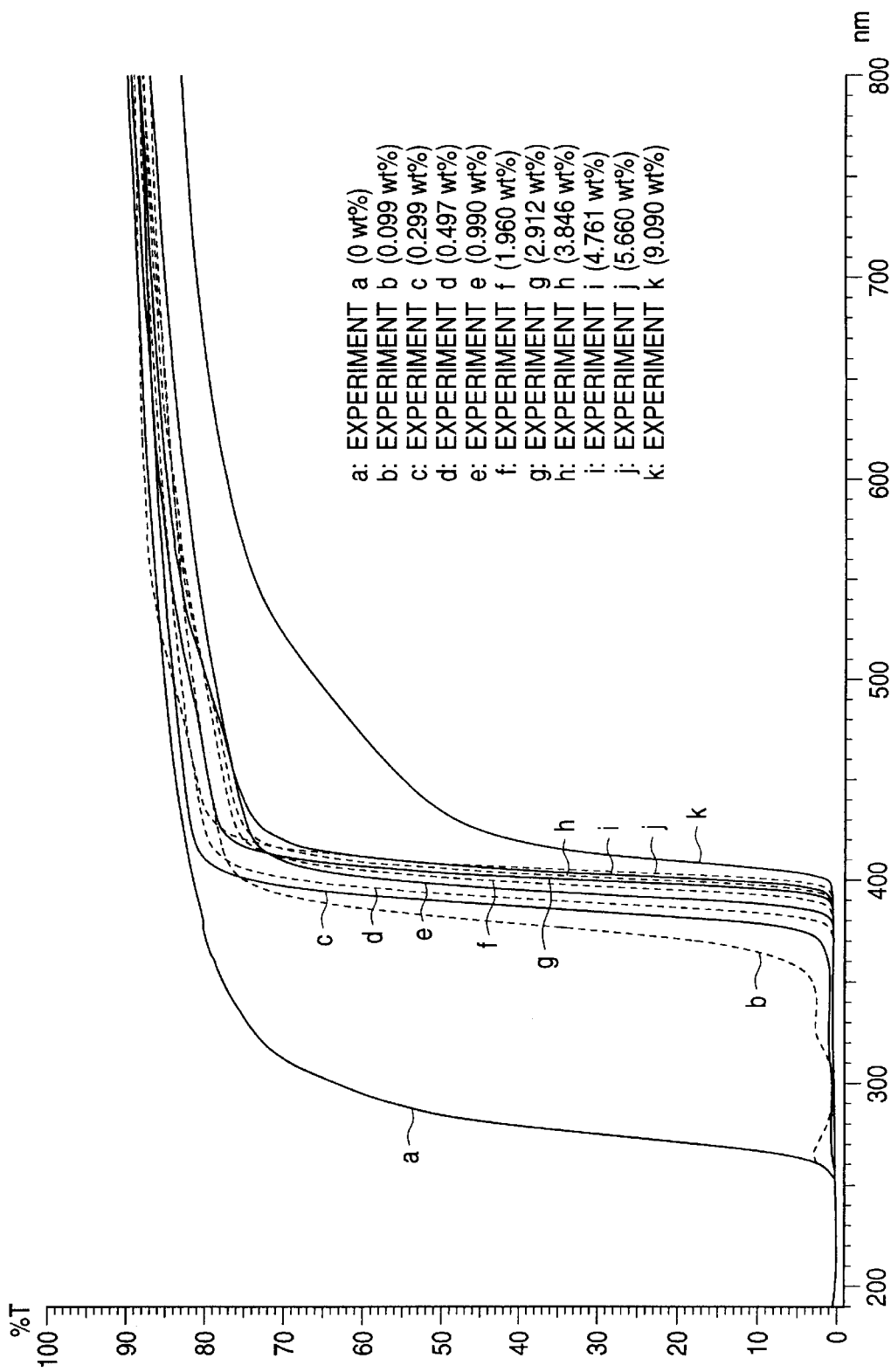
FIG. 4 illustrates the measurement results when varying mixing ratios of the ultraviolet absorbing monomer contained in the ultraviolet absorbing base material.

Changes of the absorption wavelength region and wavelength absorption ratio at varied mixing ratios of the ultraviolet absorbing monomer are shown in FIG. 4. The ultraviolet absorbing monomer used was that obtained in Example 2. FIG. 4 illustrates the measuring results of the product, which had been obtained by charging the ultraviolet absorbing monomer to a 85:13:2 (parts by weight) mixture of HEMA, EMA and EGDMA and then copolymerizing and curing the resulting mixture, by a spectrophotometer. The transmittance and wavelength region are plotted along the Y axis and Z axis, respectively. For the 85:13:2 (parts by weight) mixture of HEMA, EMA and EGDMA, provided were eleven ultraviolet absorbing monomers different in the amount (parts by weight), that is, 0 (experiment a, 0 wt. %), 0.1 (experiment b, 0.099 wt. %), 0.3 (experiment c, 0.299 wt. %), 0.5 (experiment d, 0.497 wt. %), 1 (experiment e, 0.990 wt. %), 2 (experiment f, 1.960 wt. %), 3 (experiment g, 2.912 wt. %), 4 (experiment h, 3.846 wt. %), 5 (experiment i, 4.761 wt. %), 6 (experiment j, 5.660 wt. %) and 10 (experiment k, 9.090 wt. %).

Appropriate conditions of the ultraviolet absorbing base material suited for use in the manufacture of an intraocular lens are that it should absorb rays of an ultraviolet region as much as possible and that the insertion of the intraocular lens should not bring about much change in the sight compared with the sight in the presence of the crystalline lens. The results of the experiments were judged after the consideration of the above-described conditions. Although the ultraviolet absorbing base material can be mixed within a region of from 0.1 to 10 (experiments b to k) on a weight basis, it is preferred to add and copolymerize ultraviolet absorbing monomers in an amount ranging from 0.3 to 6 (experiments c to j, about 0.3 to 5.5 wt. %). At this time, the mixing ratios of HEMA and EMA are 70 to 90 wt. % and about 8 to 20 wt. %, respectively.

As described above, the present invention makes it possible to provide an ultraviolet absorbing base material which can be obtained easily by the synthesis, has a relatively wide intramolecular space and even so can absorb ultraviolet rays stably, more specifically, absorb ultraviolet rays stably without elution of an ultraviolet absorbent. The present invention also makes it possible to provide an ultraviolet absorbing base material which has the optimum wavelength absorption region, is handled easily upon insertion of the lens, is comparatively quiet in the expanding behavior in the eye and has sufficient strength.

What is claimed is:

1. An ultraviolet absorbing base material for forming an intraocular lens used in place of a crystalline lens in an eye in which a vinyl copolymerizable monomer comprising 2-hydroxyethyl methacrylate in an amount of 80 to 90 wt % based on the base material and a benzotriazole ultraviolet absorbing monomer represented by formula (I) are copolymerized:

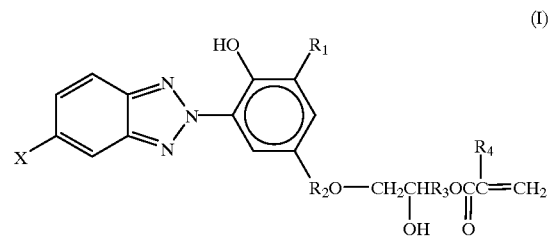

wherein X represents H or a halogen, $R_1$ is H or an alkyl group having 1 to 6 carbon atoms, $R_2$ and $R_3$ each represents a linear or branched $C_1$–$C_{10}$ alkylene group and $R_4$ represents H or $CH_3$.

2. An ultraviolet absorbing base material according to claim 1, wherein the ultraviolet absorbing monomer is 2-[2-hydroxy-5-methacryloxy(2'-hydroxy-3'-propoxy) propyl-3-t-butylphenyl]-2H-benzotriazole.

3. An ultraviolet absorbing base material for forming an intraocular lens used in place of a crystalline lens in an eye in which a vinyl copolymerizable monomer comprising 2-hydroxyethyl methacrylate in an amount of 80 to 90 wt % based on the base material and a benzotriazole ultraviolet absorbing monomer represented by formula (II) are copolymerized:

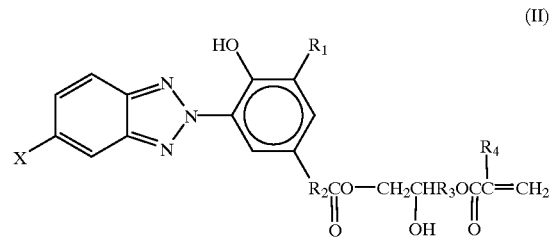

wherein X represents H or a halogen, $R_1$ is H or an alkyl group having 1 to 6 carbon atoms, $R_2$ and $R_3$ each represents a linear or branched $C_1$–$C_{10}$ alkylene group and $R_4$ represents H or $CH_3$.

4. An ultraviolet absorbing base material according to claim 3, wherein the ultraviolet absorbing monomer is 2-[2-hydroxy-5-methacyloxy(2'-hydroxy-3'-propoxy)(1'-oxopropyl)-3-t-butylphenyl]-2H-benzotriazole.

5. An ultraviolet absorbing base material according to claim 1, wherein ethyl methacrylate as the vinyl copolymerizable monomer is further copolymerized in an amount of 8 to 20 wt % based on the base material.

6. An ultraviolet absorbing base material according to claim 5, wherein the ultraviolet absorbing monomer is copolymerized in an amount of 0.3 to 5.5 wt % based on the base material.

7. An ultraviolet absorbing base material according to claim 3, wherein ethyl methacrylate as the vinyl copolymerizable monomer is further copolymerized in an amount of 8 to 20 wt % based on the base material.

8. An ultraviolet absorbing base material according to claim 7, wherein the ultraviolet absorbing monomer is copolymerized in an amount of 0.3 to 5.5 wt % based on the base material.

9. An ultraviolet absorbing base material according to claim 1, wherein the benzotriazole ultraviolet absorbing monomer represented by formula (I) is obtained by replacing a benzotriazole end with a carboxyl or hydroxyl group and subjecting the compound having a carboxyl or hydroxyl group to ring-opening polymerization with glycidyl methacrylate under an alkaline condition.

10. An ultraviolet absorbing base material according to claim 3, wherein the benzotriazole ultraviolet absorbing monomer represented by formula (II) is obtained by replacing a benzotriazole end with a carboxyl or hydroxyl group and subjecting the compound having a carboxyl or hydroxyl group to ring-opening polymerization with glycidyl methacrylate under an alkaline condition.

11. An intraocular lens used in place of a crystalline lens in an eye, comprising an ultraviolet absorbing base material in which a vinyl copolymerizable monomer comprising 2-hydroxyethyl methacrylate in an amount of 80 to 90 wt % based on the base material and a benzotriazole ultraviolet absorbing monomer represented by formula (I) are copolymerized:

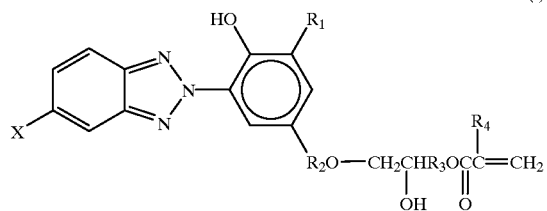

(I)

wherein X represents H or a halogen, $R_1$ is H or an alkyl group having 1 to 6 carbon atoms, $R_2$ and $R_3$ each represents a linear or branched $C_1$–$C_{10}$ alkylene group and $R_4$ represents H or $CH_3$.

12. An intraocular lens used in place of a crystalline lens in an eye, comprising an ultraviolet absorbing base material in which a vinyl copolymerizable monomer comprising 2-hydroxyethyl amount of 80 to 90 wt % based on the base material and a benzotriazole ultraviolet absorbing monomer represented by formula (II) are copolymerized:

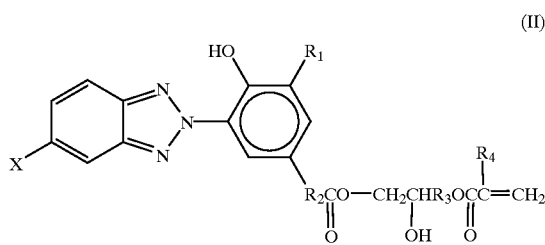

(II)

wherein X represents H or a halogen, $R_1$ is H or an alkyl group having 1 to 6 carbon atoms, $R_2$ and $R_3$ each represents a linear or branched $C_1$–$C_{10}$ alkylene group and $R_4$ represents H or $CH_3$.

* * * * *